United States Patent
Ono et al.

(10) Patent No.: US 9,376,601 B2
(45) Date of Patent: Jun. 28, 2016

(54) ADHESIVE COMPOSITION AND ADHESIVE SHEET FOR SLIDE RAIL, AND METHOD FOR FIXING SLIDE RAIL

(75) Inventors: Yoshitomo Ono, Itabashi-ku (JP); Tadahiro Tominou, Itabashi-ku (JP); Yumiko Amino, Itabashi-ku (JP); Shigeyuki Yaguchi, Itabashi-ku (JP)

(73) Assignee: LINTEC CORPORATION, Tokyo (JP)

( * ) Notice: Subject to any disclaimer, the term of this patent is extended or adjusted under 35 U.S.C. 154(b) by 575 days.

(21) Appl. No.: 13/395,783

(22) PCT Filed: Sep. 3, 2010

(86) PCT No.: PCT/JP2010/065670
§ 371 (c)(1),
(2), (4) Date: Mar. 13, 2012

(87) PCT Pub. No.: WO2011/030876
PCT Pub. Date: Mar. 17, 2011

(65) Prior Publication Data
US 2012/0270043 A1    Oct. 25, 2012

(30) Foreign Application Priority Data
Sep. 14, 2009 (JP) ................................. 2009-211369

(51) Int. Cl.
| C09J 11/04 | (2006.01) |
| C09J 9/00 | (2006.01) |
| C09J 167/00 | (2006.01) |
| H01F 1/34 | (2006.01) |
| H01F 1/37 | (2006.01) |
| C08K 3/22 | (2006.01) |

(52) U.S. Cl.
CPC . *C09J 11/04* (2013.01); *C08K 3/22* (2013.01); *C09J 9/00* (2013.01); *C09J 167/00* (2013.01); *C08K 2003/2265* (2013.01); *C08K 2201/01* (2013.01); *C09J 2201/61* (2013.01); *C09J 2201/622* (2013.01); *C09J 2205/102* (2013.01); *C09J 2400/10* (2013.01); *H01F 1/344* (2013.01); *H01F 1/37* (2013.01); *Y10T 156/10* (2015.01); *Y10T 428/2857* (2015.01)

(58) Field of Classification Search
None
See application file for complete search history.

(56) References Cited

U.S. PATENT DOCUMENTS

| 4,427,481 A | 1/1984 | Smith et al. |
| 4,693,775 A | 9/1987 | Harrison et al. |
| 5,123,989 A * | 6/1992 | Horiishi et al. ............ 156/272.4 |
| 5,179,192 A * | 1/1993 | Kanaka ............... C09K 19/3809 524/601 |
| 5,769,996 A * | 6/1998 | McArdle .................. H01F 1/44 156/272.4 |
| 2001/0052838 A1* | 12/2001 | Hamanaka ................ H01F 3/08 336/200 |
| 2003/0168640 A1 | 9/2003 | Kirsten |
| 2009/0117361 A1* | 5/2009 | Ono et al. ..................... 428/220 |
| 2009/0230347 A1* | 9/2009 | Pridohl .................. B82Y 25/00 252/62.54 |
| 2011/0014463 A1* | 1/2011 | Yaguchi et al. ............... 428/343 |
| 2011/0020642 A1* | 1/2011 | Yaguchi et al. ......... 428/355 AC |
| 2011/0274862 A1* | 11/2011 | Yaguchi et al. .............. 428/40.1 |

FOREIGN PATENT DOCUMENTS

| DE | WO 2006058689 A1 * | 6/2006 | ............ B82Y 25/00 |
| JP | 54-126241 A | 10/1979 | |
| JP | 61-171783 A | 8/1986 | |
| JP | 62-225579 A | 10/1987 | |
| JP | 2-114484 A | 4/1990 | |
| JP | 4-93381 A | 3/1992 | |
| JP | 4-23629 Y2 | 6/1992 | |
| JP | 5-311134 A | 11/1993 | |
| JP | 5-340058 A | 12/1993 | |
| JP | 2000-191987 A | 7/2000 | |
| JP | 2002-144868 A | 5/2002 | |
| JP | 2004-506065 A | 2/2004 | |
| JP | 2004-194826 A | 7/2004 | |
| JP | 2006315234 A * | 11/2006 | |
| JP | 2008-302829 A | 12/2008 | |
| WO | 2009/119883 A1 | 10/2009 | |
| WO | 2009/119885 A1 | 10/2009 | |
| WO | WO 2010044311 A1 * | 4/2010 | |

OTHER PUBLICATIONS

Partial translation of JP 05-311134 A (1993).*
International Search Report, dated Dec. 7, 2010, issued by the International Searching Authority, in counterpart Application No. PCT/JP2010/065670.

* cited by examiner

*Primary Examiner* — Scott R Walshon
(74) *Attorney, Agent, or Firm* — Procopio, Cory, Hargreaves & Savitch LLP

(57) ABSTRACT

An adhesive composition for slide rail exhibits excellent workability in attaching a slide rail to a vehicle body and has a strong adhesive force after heating, the magnetic flux density of which can be lowered, which sustains the strong adhesive force after heating and then returning to room temperature so as to allow the firm fixation of the slide rail to the vehicle body, and which can lower the volume of the noise caused by opening/closing of a door. Specifically disclosed is an adhesive composition for slide rail which includes a hot-melt adhesive and a ferromagnetic substance, wherein the composition shows a density at 20° C. of 1.4-4.5 g/cm3 and has such magnetic properties that the magnetic flux density of an adhesive sheet, that is obtained by molding the composition, at a position 1 cm apart from the surface of the adhesive sheet is 10 mT or more.

20 Claims, No Drawings

ADHESIVE COMPOSITION AND ADHESIVE SHEET FOR SLIDE RAIL, AND METHOD FOR FIXING SLIDE RAIL

CROSS REFERENCE TO RELATED APPLICATIONS

This application is a National Stage of International Application No. PCT/JP2010/065670 filed on Sep. 3, 2010, the contents of which are incorporated herein by reference in their entirety.

TECHNICAL FIELD

The present invention relates to an adhesive composition for a slide rail which can be used for fixing a slide rail to be attached on a body of an automobile or the like, an adhesive sheet having a layer composed of the adhesive composition for a slide rail, a laminate of the adhesive sheet and a slide rail, and a method for fixing a slide rail.

BACKGROUND ART

Conventionally, in the specific kinds of automobiles, a slide door has been attached on an automobile body as an automobile door. Almost of the slide door have a structure to be able to move the slide door in fore and aft direction of the automobile by rolling the roller equipped in the back side of the door or the like on the surface of the slide rail formed on the body.

The slide rail has been needed to have a flaw proofing property, a durability and a soundproof property by rolling of the roller, and to be composed of a rust proofing material. Therefore, the slide rail is ordinarily composed of a stainless steel. Against the slide rail, the body is ordinarily not made of the stainless steel. Accordingly, the slide rail and the body are not made by integrating with one material. The attaching of the slide rail to the body is conducted at the time of the fabricating of the body.

As a method for attaching the slide rail on the body, a method which comprises fixing the slide rail on the body by sticking the slide rail on the body at room temperature with an adhesive being attachable at the room temperature, is ordinarily performed. For example, a method which comprises fixing the slide rail on the body by sticking the adhesive sheet provided with adhesive layers being attachable at the room temperature on the both surfaces of an adhesive sheet substrate, on a back surface of the slide rail at room temperature, to prepare the slide rail with the adhesive sheet and then, by adhering and laminating the slide rail with the adhesive sheet on the body at the surface of the adhesive layer is suggested (see JP 2008-302829AI).

In the method for fixing the slide rail by sticking at room temperature, there have been problems that if the slide rail is positioned incorrectly to the location to be stuck at the time of the attaching of the slide rail on the body, it is difficult to peel off the slide rail from the incorrect location and reattach to the correct location, or it is difficult to position to the correct location by moving the slide rail on the surface of the body in the state that the slide rail is stuck, and therefore, the workability is remarkably decreased.

Also, there have been problems that if the slide rail is not firmly fixed on the body, nonconformities are caused, for example, the shift of the fixed location of the slide rail is caused, and therefore, the opening or shutting of the slide door can be not easily performed, or the vibration or the extraordinary sound is generated at the time of opening or shutting of the slide door as the opening or shutting of the slide door is performed for a long time.

Further, it is needed to decrease the sound volume of the sound generated by rolling of the roller on the slide rail at the time of opening or shutting of the slide door (that is, soundproof property).

DISCLOSURE OF THE INVENTION

The present invention is provided as the result of considering the situation of the conventional technologies described above.

An object of the present invention is to provide an adhesive composition for a slide rail which can position the slide rail to the correct location by providing a state that the slide rail is held on the body by means of not adhesive force but magnetic flux density and moving easily the slide rail in an initial stage of the attaching and laminating of the slide rail to the body at room temperature (ordinary temperature), even if the slide rail is positioned incorrectly to the location to be adhered on attaching of the slide rail, can position the slide rail to the correct location by moving easily the slide rail, can increase remarkably the workability for attaching the slide rail on the body, can obtain strong adhesive strength and weak magnetic flux density after heating, can fix the slide rail to the body by maintaining the strong adhesive strength if the adhesive composition for a slide rail is returned to the room temperature after heating, and can decrease the sound volume of the sound generated by rolling of the roller on the slide rail at the time of opening or shutting of the slide door.

Another object of the present invention is to provide an adhesive sheet having a layer composed of the adhesive composition for a slide rail, a laminate of the adhesive sheet and a slide rail obtained by laminating the adhesive sheet and the slide rail, and a method for fixing a slide rail which is remarkably superior in the workability for attaching the slide rail to the body.

The present inventors have perfected the present invention by discovering an adhesive composition for a slide rail, which comprises a hot-melt adhesive and a ferromagnetic material, wherein a density at 20° C. of the composition is 1.4 to 4.5 g/cm$^3$, and the composition has a magnetism that a magnetic flux density at a position which is 1 cm away from a surface of an adhesive sheet obtained by forming the composition is 10 mT or more, and the above-described problems can be solved by thereof.

That is to say, the present invention provides an adhesive composition for a slide rail, which comprises a hot-melt adhesive and a ferromagnetic material, wherein a density at 20° C. of the composition is 1.4 to 4.5 g/cm$^3$, and the composition has a magnetism that a magnetic flux density at a position which is 1 cm away from a surface of an adhesive sheet obtained by forming the composition is 10 mT or more.

Additionally, the present invention provides the adhesive composition for a slide rail as described above, wherein the ferromagnetic material is a ferrite.

Also, the present invention provides the adhesive composition for a slide rail as described above, wherein the hot-melt adhesive is a polyester resin based hot-melt adhesive.

Further, the present invention provides an adhesive sheet for a slide rail which is a sheet having a layer composed of each of the adhesive composition for a slide rail as described above.

Furthermore, the present invention provides an adhesive laminate of a slide rail which comprises the adhesive sheet as described above and a slide rail laminated on the adhesive sheet.

Furthermore, the present invention provides a method for fixing a slide rail which comprises temporarily fixing a slide rail on a member of a body with the adhesive sheet for the slide rail as described above, and then fixing the slide rail by heating the adhesive sheet for slide rail.

The adhesive composition for a slide rail of the present invention can provide a state that the slide rail is held on the body by means of not adhesive force but magnetic flux density and does not almost have a tack in an initial stage of the attaching and laminating of the slide rail to the body composed of a metal or the like at room temperature (ordinary temperature), and therefore, can position the slide rail to the correct location by moving easily the slide rail even if the slide rail is positioned incorrectly to the location to be adhered on attaching of the slide rail, so that the workability for attaching the slide rail on the body can be increased remarkably. Further, the adhesive composition for a slide rail which hold the slide rail on the body by means of the magnetic flux density at room temperature can obtain strong adhesive strength and weak magnetic flux density by heating, and maintain the strong adhesive strength when the adhesive composition for a slide rail is returned to the room temperature after heating, so that the slide rail can be fixed firmly to the body. Accordingly, the adhesive composition for a slide rail can be utilized instead of a bolt or a screw as a bond means. Furthermore, the adhesive composition for a slide rail decreases the magnetic flux density by heating and maintains the weak magnetic flux density when the adhesive composition for the adhesive composition for a slide rail is returned to the room temperature after heating, so that the bad influence caused by the magnetic flux density can be prevented. Also, the adhesive composition for a slide rail decreases the sound volume of the sound generated by rolling of the roller on the slide rail at the time of opening or shutting of the slide door.

EMBODIMENTS FOR CARRYING OUT THE INVENTION

The adhesive composition for a slide rail of the present invention comprises a hot-melt adhesive and a ferromagnetic material.

The hot-melt adhesive is an adhesive which has no tack or has almost no tack at room temperature (ordinary temperature), but is softened by heating and generates adhesive property, and then is solidified by returning the heated hot-melt adhesive to the room temperature, and can adhere thereby.

The hot-melt adhesive includes a rubber based hot-melt adhesive, a polyolefin resin based hot-melt adhesive and a polyester resin based hot-melt adhesive. Among them, the polyester resin based hot-melt adhesive is preferable in particular, in view of the fact that the shearing force of the adhesive composition for the slide rail is high at the room temperature after the adhering by heating and the shift from the location of the slide rail to be fixed can be prevented.

Examples of the rubber based hot-melt adhesive include a rubber based hot-melt adhesive obtained by adding a petroleum resin into a styrene-isoprene-styrene block copolymer or a styrene-butadiene-styrene block copolymer.

Examples of the polyolefin resin based hot-melt adhesive include a propylene-ethylene-butene-1 copolymer and an ethylene-vinyl acetate copolymer.

Examples of the polyester resin based hot-melt adhesive include a condensation polymer of a di-carboxyl acid ingredient and a diol ingredient. The di-carboxyl acid ingredient includes terephthalic acid, isophthalic acid and lower alkyl ester thereof, and malonic acid, succinic acid, adipic acid and sebatic acid. The diol ingredient includes ethylene glycol, 1,3-propane diol, 1,4-butane diol, 1,5-pentane diol, 1,6-hexane diol, diethylene glycol, triethylene glycol, polyethylene glycol, cyclohexane dimethanol, neopentyl glycol and polytetramethylene glycol. The polyester resin based hot-melt adhesive can be obtained by using each one or more members selected from these di-carboxyl acid ingredient and these diol ingredient.

Commercial product of the rubber based hot-melt adhesive includes "TY-70" (which is a styrene-isoprene-styrene block copolymer (SIS) based hot-melt adhesive) produced by MORESCO Corporation.

Commercial product of the polyolefin resin based hot-melt adhesive includes "MORESCOMELT EP-167" produced by MORESCO Corporation.

Commercial product of the polyester resin based hot-melt adhesive which is proper for the adhesive formed product of the present invention, includes "POLYESTAR SP-180" and "POLYESTAR TP-249" produced by The Nippon Synthetic Chemical Industry Co., Ltd.

The melting point (fusion temperature) of the hot-melt adhesive is preferably in the range of 80 to 200° C., more preferably in the range of 90 to 200° C., and most preferably in the range of 110 to 180° C.

The ferromagnetic material is a substance which can have spontaneous magnetization, even if an external magnetic field does not exist. The ferromagnetic material includes also a ferrimagnetic material. Examples of the ferromagnetic material include simple substance or alloy of metal such as iron, cobalt and nickel, ferrite such as barium ferrite and strontium ferrite, rare earth magnetic material such as rare earth cobalt magnet, Alnico magnet and neodymium-iron-boron based magnet material. Among them, the ferrite is preferable in view of the strong magnetic flux density and the availability. The crystal structure of the ferrite can be spinel type structure, hexagonal type structure or garnet type structure.

In order to control the density at 20° C. of the adhesive composition for the slide rail in the range of 1.4 to 4.5 g/cm$^3$, the density of the ferromagnetic material is preferably in the range of 3.0 g/cm$^3$ or more, and more preferably in the range of 4.0 to 10.0 g/cm$^3$.

The ferromagnetic material is preferably powder (hereinafter, the powder of the ferromagnetic material is called as "magnetic powder"). The average particle size of the magnetic powder is preferably in the range of 0.5 to 20 μm, more preferably in the range of 0.5 to 15 μm, and most preferably in the range of 1 to 5 μm. The average particle size of the magnetic powder is measured by laser diffraction according to JIS Z8825-1.

The mixing ratio of the magnetic powder is preferably in the range of 92:8 to 45:55, more preferably in the range of 90:10 to 50:50, and most preferably in the range of 80:20 to 48:52 in volume ratio of the hot-melt adhesive and the magnetic powder.

For dispersing the magnetic powder in the hot-melt adhesive, it is preferable to mix by heating the hot-melt adhesive and the magnetic powder. The heating temperature is preferably in the range of 110 to 230° C., more preferably in the range of 110 to 200° C., furthermore preferably in the range of 120 to 180° C., and most preferably in the range of 130 to 170° C. Also, the heating temperature is preferably 10° C. or more higher than the fusion temperature of the hot-melt adhesive, and more preferably 20° C. to 70° C. higher than the fusion temperature of the hot-melt adhesive. By mixing at the temperature range, the magnetic powder can be homogeneously dispersed in the hot-melt adhesive, and also, it is able to prevent the deterioration of the hot-melt adhesive.

The hot-melt adhesive has preferably a viscosity of 5 to 500 Pa·s at the heating temperature. When the viscosity is in the range, the dispersion of the ferromagnetic material in the hot-melt adhesive can be easily maintained, and the oozing out of the adhesive and the thickness change of the adhesive layer are not caused under the heating condition (in general, in the range of 110 to 230° C.) at the time that the slide rail is stuck.

In the present invention, the desired properties are exerted in a state that the ferromagnetic material in the adhesive composition is magnetized. Therefore, the hot-melt adhesive and the magnetized magnetic powder can be mixed, or the hot-melt adhesive and the magnetic powder which is not magnetized can be mixed. In the later case, the magnetization can be conducted after the hot-melt adhesive and the magnetic powder are mixed. The magnetization can be conducted by well known methods.

When the hot-melt adhesive and the magnetized magnetic powder are mixed by heating, there is a case that the demagnetization is caused. In this case, the magnetization can be conducted.

In the adhesive composition for the slide rail of the present invention, one or more members of a tackifier, an antioxidant, a filler, a dispersing agent or the like can be properly compounded. However, the hot-melt adhesive composition for the slide rail of the present invention does not preferably contain a foaming agent for maintaining the strong adhesion strength.

The adhesive composition for the slide rail of the present invention has preferably a density at 20° C. of 1.4 to 4.5 g/cm$^3$. By controlling the density at 20° C. in the range of 1.4 to 4.5 g/cm$^3$, the superior soundproof property can be obtained. The density at 20° C. is preferably in the range of 1.5 to 4.2 g/cm$^3$, and more preferably in the range of 1.6 to 3.8 g/cm$^3$. The measurement of the density of the adhesive composition for the slide rail of the present invention is conducted according to a balance method of JIS K0061-8.1.

The adhesive composition for the slide rail of the present invention has a magnetism that a magnetic flux density at a position which is 1 cm away from a surface of an adhesive sheet obtained by forming the composition is 10 mT or more. Herein, the magnetic flux density can be called as a surface magnetic flux density. When the surface magnetic flux density is not less than 10 mT, the slide rail can be fixed temporarily to the body, and therefore, the decision of the location for the slide rail is easily performed. The surface magnetic flux density is preferably not less than 15 mT, more preferably not less than 20 mT and most preferably not less than 24 mT.

No particular constraint is imposed on the upper limit value of the surface magnetic flux density; however, usually the upper limit value of the surface magnetic flux density is preferably not more than 200 mT, more preferably not more than 150 mT, and most preferably not more than 100 mT, in view of the workability for reattaching to adhere the slide rail. The measurement of the surface magnetic flux density is performed by using a Gaussian meter.

Also, with respect to the magnetism of the adhesive composition for the slide rail of the present invention, the surface magnetic flux density after heating is preferably less than 5 mT, more preferably not more than 3 mT and most preferably not more than 1.5 mT. The lower limit value of the surface magnetic flux density is 0.

Herein, the surface magnetic flux density after heating means the surface magnetic flux density measured by a Gaussian meter at a distance which is 1 cm apart from the surface of the adhesive sheet or the adhesive formed article, after the adhesive sheet or the adhesive formed article is heated at 180° C. for 40 minutes and then, is returned to the room temperature.

The adhesive composition for the slide rail of the present invention has a shearing force after heat adhesion at 150° C. for 10 minutes of preferably not less than 250 N, more preferably not less than 300 N, furthermore preferably not less than 350 N and most preferably not less than 400 N.

Herein, the shearing force after heat adhesion at 150° C. for 10 minutes means the shearing force of the sheet of the adhesive composition measured according to JIS K6850, after the adhesive composition is formed in the sheet having a thickness of 500 μm, the sheet is sandwiched between two adherend tool, the sheet is heated at 150° C. for 10 minutes and then, the sheet is returned to the room temperature. When the shearing force is not less than 250 N, the shift from the location for fixing the slide rail can be effectively prevented.

The adhesive composition of the present invention has preferably a viscosity of 5 to 500 Pa·s, and more preferably a viscosity of 15 to 200 Pa·s at 130° C. When the viscosity is in the range, the state that the ferromagnetic material is dispersed in the hot-melt reattachable adhesive can be maintained even if the adhesive composition is heated. The measurement of the viscosity is conducted according to the method of JIS K6833, except that the temperature of the sample is 130° C.

The adhesive sheet for a slide rail of the present invention is a sheet having a layer composed of the adhesive composition for the slide rail of the present invention.

No particular constraint is imposed on the thickness of the adhesive sheet for a slide rail of the present invention; however, usually the thickness of the layer composed of the adhesive composition for the slide rail falls preferably within a range from 3 to 1000 μm, more preferably within a range from 5 to 800 μm, and most preferably within a range from 10 to 700 μm.

Thus, the adhesive sheet for the slide rail of the present invention has a strong surface magnetic flux density at room temperature before heating, and has no tack or has almost no tack at room temperature. Therefore, the adhesive sheet for the slide rail of the present invention can be stuck to the adherend such as automobile body composed of metal or the like exhibiting ferromagnetic property at room temperature by means of only the surface magnetic flux density. Even if the positioning of the location of the adhesive sheet for the slide rail to be attached is incorrect, the adhesive sheet of the slide rail can position easily to a correct location over again. Therefore, there is no adhesive residue at the incorrect location of the positioning, after the adhesive sheet for the slide rail is reattached. Also, the adhesive sheet for the slide rail generates strong adhesive force by heating, and therefore, can be adhered strongly to the adherend such as the body composed of metal or the like, and further, can be adhered strongly to the adherend such as the body if the adhesive sheet is returned to the room temperature after heating. And, the surface magnetic flux density of the adhesive sheet can be decreased to a small value when the adhesive sheet is heated, and further, the surface magnetic flux density of the adhesive sheet can maintain a small value when the adhesive sheet is returned to the room temperature after heating. Therefore, the influence of the magnetic flux density to the human or electronic equipment can be suppressed as much as possible. Also, the adhesive sheet for a slide rail has the superior soundproof property, and therefore, the adhesive sheet for a slide rail can decrease the sound volume of the noise generated at the time of opening or shutting of the slide door.

The adhesive sheet for the slide rail of the present invention can be produced by a method which comprises heating the adhesive composition for the slide rail to change to fluid state, and applying the fluidized adhesive composition on the surface of a release liner to form a layer composed of the adhesive composition for the slide rail, or a method which comprises extruding the adhesive composition for the slide rail in a sheet form by an extruder to form a layer composed of the adhesive composition for the slide rail. The temperature of the adhesive composition for the slide rail at the time of the applying is preferably in the range of 130 to 170° C. The extruding temperature of the adhesive composition for the slide rail is preferably in the range of 130 to 170° C.

As the release liner, a release liner provided with the releasing treatment on both surfaces of a base sheet or a release liner provided with the releasing treatment on one surface of a base sheet can be used.

The release liner includes, for example, release liners obtained by applying a release agent such as silicone resin on paper materials such as a glassine paper, a coated paper and a wood free paper, a laminated paper which is laminated with a thermoplastic resin such as polyethylene on the paper material thereof, or a plastic film such as films of polyester resin like polyethylene terephthalate resin, polybutylene terephthalate resin and polyethylene naphthalate resin; or films of polyolefin resin such as polypropylene resin and polyethylene resin as the base sheet.

No particular constraint is imposed on the thickness of the release liner; however, usually the thickness falls preferably within a range from 20 to 200 µm.

When the slide rail is attached to the body, the release liner of the adhesive sheet for the slide rail with the release liner described above is removed, and the adhesive sheet consisting of only the adhesive layer is arranged between the slide rail and the body. Accordingly, the slide rail can be effectively attached to the body, without using extra material.

The adhesive sheet for the slide rail of the present invention can be also an adhesive sheet with a substrate sheet for the slide rail which comprises a substrate sheet and a layer composed of the adhesive composition for the slide rail, wherein the layer is laminated on one surface or both surfaces of the substrate sheet.

Herein, in the adhesive sheet with a substrate sheet for the slide rail which comprises a substrate sheet and a layer composed of the adhesive composition for the slide rail, wherein the layer is laminated on one surface of the substrate sheet, the slide rail can be laminated to the body by arranging the layer composed of the adhesive composition for the slide rail on the side of the body, and forming the other adhesive layer on the other surface of the substrate sheet. The other adhesive includes a hot-melt adhesive which does not contain the ferromagnetic material.

Examples of the substrate sheet include, for example, sheets or films of various synthetic resins of polyolefin resins such as polyethylene resin and polypropylene resin; polyester resins such as polyethylene terephthalate resin, polyethylene naphthalate resin and polybutylene terephthalate resin; polyvinyl chloride resins; polystyrene resins; polyurethane resins; polycarbonate resins; polyamide resins; polyimide resins; fluorine resins and the like. In view of high strength and cheap cost, sheets or films of polyester resins such as polyethylene terephthalate resin are preferable. The substrate sheet can be a single layer or a multiple layers having two or more layers of the same type or different types.

No particular constraint is imposed on the thickness of the substrate sheet; however, usually the thickness falls preferably within a range from 10 to 350 µm, more preferably within a range from 25 to 300 µm, and most preferably within a range from 50 to 250 µm.

On the surface of the substrate sheet, a treatment for improving adhesion can be provided. The treatment for improving adhesion is not limited particularly, but includes, for example, corona discharge treatment.

In the adhesive sheet with a substrate sheet for the slide rail of the present invention, the layer composed of the adhesive composition for the slide rail described above is formed on one surface or both surfaces of the substrate sheet.

No particular constraint is imposed on the thickness of the layer composed of the adhesive composition for the slide rail; however, usually the thickness falls preferably within a range from 3 to 500 µm, more preferably within a range from 5 to 400 µm, most preferably within a range from 10 to 300 µm.

The adhesive sheet having the layer composed of the adhesive composition for the slide rail on one surface or both surfaces of the substrate sheet, can be produced by a method which comprises applying the heated adhesive composition for the slide rail on one surface or both surfaces of the substrate sheet, or a method which comprises extruding the heated adhesive composition for the slide rail in a sheet form by an extruder, and then, laminating the extruded adhesive composition on one surface or both surfaces of the substrate sheet. The temperature of the adhesive composition for the slide rail at the time of the applying is preferably in the range of 130 to 170° C. The extruding temperature of the adhesive composition for the slide rail is preferably in the range of 130 to 170° C.

In addition, the adhesive sheet with a substrate sheet for the slide rail can be produced by forming the layer comprising the adhesive composition for the slide rail of the present invention on the surface of the release liner described above, and then, laminating the substrate sheet on the surface thereof.

The adhesive sheet for the slide rail of the present invention can be used to fix the slide rail on the surface of the body composed of metal or the like exhibiting ferromagnetic property. As long as the metal can be usually formed in the body and can exhibit ferromagnetic property, the metal is not limited particularly, but includes, for example, iron and nickel.

The adhesive sheet for the slide rail of the present invention has the magnetic flux density at the room temperature before heating, and therefore, is applicable to various articles which need to attach the slide rail except for the body, as long as the article is held by means of the magnetic flux density.

The adhesive sheet of the present invention is preferably heated after holding on the article by means of magnetic flux density, and cooled after heating. The heating temperature is preferably in the range of 110 to 200° C., more preferably in the range of 120 to 190° C., and most preferably in the range of 130 to 180° C.

In the present invention, the attachment of the slide rail on the body is performed by temporarily fixing a slide rail on a member of a body with the adhesive sheet for the slide rail, and then, fixing the slide rail by heating the adhesive sheet for slide rail.

The temporary fixing means the state that the slide rail is held on the member of the body, and the slide rail can be easily peeled off or the location of the slide rail held on the surface of the member of the body can be moved. And, the fixing means the state that the slide rail is strongly held on the member of the body, and the shift from the fixed location of the slide rail is not caused substantially by the force added at the time of the usual use of the slide rail.

When the slide rail is attached to body, it is preferable to form preliminarily an adhesive laminate of a slide rail by laminating the adhesive sheet for the slide rail and the slide rail, and to fix temporarily the adhesive laminate of a slide rail on the member of the body.

The slide rail can be in various forms which can function to move the slide door in fore and aft direction of the body by rolling the roller equipped in the back side of the door or the like on the surface of the slide rail formed on the body.

Accordingly, the form of the slide rail is not limited in particular, as long as the form of the slide rail is a form wherein the roller for rolling can be rolled, but, includes usually a sheet form, a plate form, a columnar form and a pole form, and the sheet form and the plate form are preferable.

The thickness of the slide rail having the sheet form or the plate form is usually preferably in the range of more than 0.5 mm and not more than 20 mm, and more preferably in the range from 1 to 10 mm.

The material of the slide rail is not limited, as long as the slide rail can be held on the body by means of the magnetic flux density of the adhesive sheet for the slide rail of the present invention, and the slide rail can have a flaw proofing property which can prevent the flaw caused by the rolling of the roller, a durability and a rust proofing property, but a stainless steel is preferable.

After the slide rail is fixed, the coating of the body with a paint is performed. Therefore, in order to prevent the adhesion of the paint or the like on the surface of the slide rail, the surface of the slide rail is preferably to be covered with a masking tape and then, be applied with the paint and further, remove the masking tape after applying. If the paint or the like is adhered on the surface of the slide rail, the film of the adhered paint is peeled off and entwined on the roller or the like at the time of the rolling of the roller of the slide door on the surface of the slide rail. Therefore, the nonconformities are caused, for example, the opening or shutting of the slide door is not performed easily, or the vibration or the extraordinary sound is generated.

The covering of the masking tape on the surface of the slide rail can be performed on the surface of the slide rail prior to laminate the adhesive sheet for the slide rail and the slide rail, or can be performed on the surface of the slide rail after laminating the adhesive sheet for the slide rail and the slide rail.

The masking tape is needed to have a paint resistance to the used paint and a heat resistance since almost of drying and heat curing of the film of the paint after painting is performed at high temperature.

The masking tape includes a masking tape in which an adhesive layer is formed on one surface of the substrate sheet.

The substrate sheet of the masking tape includes substrate sheets which are the same substrates as described in the substrate of the adhesive sheet for the slide rail.

The adhesive has a tack at room temperature and includes, for example, natural rubber-based adhesives, synthetic rubber-based adhesives, acrylic resin-based adhesives, polyvinylether resin-based adhesives, urethane resin-based adhesives and silicone resin-based adhesives.

No particular constraint is imposed on the thickness of the adhesive layer; however, usually the thickness after drying falls preferably within a range from 3 to 150 µm, more preferably within a range from 5 to 100 µm and particularly preferably within a range from 10 to 60 µm.

The formation of adhesive layer on the surface of the substrate sheet can be conducted by applying the adhesive described above on the surface of the substrate sheet, and optionally drying.

Application methods of the adhesive described above on the substrate sheet include conventional known methods such as, for example, a bar coating method, an knife coating method, a roll coating method, a blade coating method, a die coating method, a gravure coating method and a curtain coating method.

EXAMPLES

Hereinafter, specific description will be made on the present invention with reference to Examples.

However, the present invention is not limited at all by these Examples. The density of the hot-melt adhesive and magnetic powder are values measured by the same method as the measurement of the density at 20° C. of the adhesive composition described later. Also, the average particle size of the magnetic powder is a value measured in the state of the dried powder by using a laser diffraction particle size distribution measurement device (produced by Sympatec GmbH, trade name "HELOS & RODOS").

Examples of Adhesive Composition and Adhesive Sheet

Example 1

(1) Preparation of an Adhesive Composition

Into a mixing machine (manufactured by PRIMIX Corporation, trade name "T.K. HYBISMIX 2P-1"), polyester resin based hot-melt adhesive (manufactured by Nippon Synthetic Chemical Industry Co., Ltd., trade name "POLYESTAR SP-180", having a density at 20° C. of 0.9 g/cm$^3$ and a fusion temperature of 100° C.) as the hot-melt adhesive and strontium ferrite ($SrO.6Fe_2O_3$) powder (having a density at 20° C. of 7.0 g/cm$^3$ and an average particle size of 2 µm) having a spinel type crystal structure as the magnetic powder, were charged in the volume ratio of 90:10 to mix. And then, the mixture was heated at 160° C., and mixed for 30 minutes to obtain an adhesive composition.

(2) Production of Adhesive Sheet

The adhesive composition prepared in (1) described above was extruded from a die at an extruding temperature of 160° C. by an extruder to form an adhesive layer having a thickness of 500 µm, and the extruded adhesive layer was laminated on a release treated surface of a release liner composed of a polyethylene terephthalate resin in which a surface was treated with silicone (manufactured by LINTEC Corporation, trade name "SP-PET 100(T)", thickness of 100 µm). Immediately after the lamination, the adhesive layer was cooled up to room temperature. Next, by using a high voltage condenser magnetizing and demagnetizing electric power unit (manufactured by MAGNETLABO Co., Ltd., trade name "PC-2520ND"), the magnetization was conducted under the condition of voltage of 500 V and electric current of 8 kA to form an adhesive sheet with a release liner.

Example 2

An adhesive composition and an adhesive sheet were obtained by the same method as described in Example 1, except that the compound ratio of the polyester resin based hot-melt adhesive and the strontium ferrite powder was 80:20 in the volume ratio.

Example 3

An adhesive composition and an adhesive sheet were obtained by the same method as described in Example 1, except that the compound ratio of the polyester resin based hot-melt adhesive and the strontium ferrite powder was 70:30 in the volume ratio.

Example 4

An adhesive composition and an adhesive sheet were obtained by the same method as described in Example 1, except that the compound ratio of the polyester resin based hot-melt adhesive and the strontium ferrite powder was 55:45 in the volume ratio.

Example 5

An adhesive composition and an adhesive sheet were obtained by the same method as described in Example 1, except that the compound ratio of the polyester resin based hot-melt adhesive and the strontium ferrite powder was 50:50 in the volume ratio.

Example 6

An adhesive composition and an adhesive sheet were obtained by the same method as described in Example 3, except that the magnetic powder was a barium ferrite ($BaO.6Fe_2O_3$) (having a density at 20° C. of 5.0 g/cm$^3$ and an average particle size of 2 μm) having a spinel type crystal structure.

Example 7

An adhesive composition and an adhesive sheet were obtained by the same method as described in Example 1, except that the magnetic powder was a neodymium-iron-boron based magnet powder ($Nd_2Fe_{14}B$) (having a density at 20° C. of 7.6 g/cm$^3$ and an average particle size of 2 μm)

Example 8

An adhesive composition and an adhesive sheet were obtained by the same method as described in Example 1, except that the hot-melt adhesive was a styrene-isoprene-styrene block copolymer (SIS) based hot-melt adhesive (manufactured by MORESCO Corporation, trade name "TY-70", having a density at 20° C. of 0.86 g/cm$^3$).

Comparative Example 1

As the adhesive sheet, a pressure-sensitive adhesive double coated tape (manufactured by Sumitomo 3M Limited, trade name "VHB N881") was used.

Comparative Example 2

An adhesive composition and an adhesive sheet were obtained by the same method as described in Example 1, except that the compound ratio of the polyester resin based hot-melt adhesive and the strontium ferrite powder was 93:7 in the volume ratio.

Comparative Example 3

An adhesive composition and an adhesive sheet were obtained by the same method as described in Example 1, except that the compound ratio of the polyester resin based hot-melt adhesive and the strontium ferrite powder was 40:60 in the volume ratio.

By using the obtained adhesive compositions and the adhesive sheets with the release liner, the following evaluating tests were conducted. The results together with the ingredients of composition (in volume ratio) of the adhesive composition are shown in Tables 1 to 3.

Measurement of Density at 20° C. Of the Adhesive Composition

The density at 20° C. of the adhesive composition was measured according to a balance method of JIS K0061-8.1, by using a measuring device (produced by A & D Company limited, trade name "AD-1653"). Also, the density of the pressure-sensitive adhesive double coated tape of Comparative Example 1 was measured by the same method as described above. The measurements were conducted after the release liner was removed.

Measurement of Magnetic Flux Density

From the obtained adhesive sheet with a release liner and the pressure-sensitive adhesive double coated tape of Comparative Example 1, the release liner was each removed, and a magnetic flux density (mT) at room temperature before heating was measured by a Gauss meter (manufactured by TOYOTECHNICA INC., trade name "5080 type HANDY GAUS METER") at a distance which is 1 cm apart from the surface of the adhesive layer. In addition, the obtained adhesive sheet with a release liner and the pressure-sensitive adhesive double coated tape of Comparative Example 1 were heated at 180° C., for 40 minutes and then returned to the room temperature. The release liner was each removed and then, the magnetic flux density (mT) at room temperature after heating was measured by a Gaussian meter at a distance which is 1 cm apart from the surface of the adhesive layer.

Temporary Fixing Test

In Examples 1 to 8 and Comparative examples 2 and 3, the release liner was removed from the obtained adhesive sheet with the release liner. And then, the obtained adhesive sheet was laminated on the slide rail made of a stainless steel (having a thickness of 1.2 mm, a width of 2 cm and a length of 150 cm) to form an adhesive laminate of the slide rail. The adhesive laminate of the slide rail was held to a steel plate (having a width of 5 cm and a length of 160 cm) on the side of the adhesive sheet of the adhesive laminate, and was evaluated according to the following standard. In Comparative Example 1, by using the pressure-sensitive adhesive double coated tape in which the release liner was removed, the slide rail made of a stainless steel and the steel plate were adhered and laminated, and the laminate was evaluated in the same method.

◯: The slide rail was held to the steel plate, the slide rail was easily moved by a hand operation, and there was no adhesive residue.

X: The slide rail was not held to the steel plate, or the slide rail was difficult to peel off.

Measurement of Shearing Force

In Examples 1 to 8 and Comparative examples 2 and 3, the release liner was removed from the obtained adhesive sheet with the release liner. And then, the adhesive layer of the obtained adhesive sheet was cut in 1 centimeter square and then, was sandwiched at the room temperature by two stainless steel plates (having a thickness of 3 mm). The stainless steel plates was heated at 150° C. for 10 minutes and then, was returned to the room temperature. By using the stainless steel plates, the shearing force was measured according to Japanese Industrial Standard (JIS) K6850. The test rate was 300 mm/min.

In Comparative Example 1, the adhesive layer of the pressure-sensitive adhesive double coated tape was cut in 1 centimeter square, and the release liners were removed. The adhesive layer cut in 1 centimeter square was sandwiched by two stainless steel plates (having a thickness of 3 mm). By using the stainless steel plates, the shearing force was measured according to Japanese Industrial Standard (JIS) K6850.

Load Test

In Examples 1 to 8 and Comparative examples 2 and 3, the release liner was removed from the obtained adhesive sheet with the release liner. And then, the obtained adhesive sheet (having a width of 2 cm and a length of 150 cm) was set between a slide rail made of a stainless steel (having a thickness of 1.2 mm, a width of 2 cm and a length of 150 cm) and a steel plate (having a width of 5 cm and a length of 160 cm), and was heated at 180° C. for 40 minutes to adhere. After heating and adhering, the laminate of the slide rail and the steel plate was cooled to the room temperature. On the adhered slide rail, a resin roller for rolling which had a diameter of 20 mm and was made of polyacetal, was rolled reciprocally 5000 times along to the length direction of the slide rail under the condition of a load of 45 kg. The shift between the location of the center liner of the slide rail before rolling on the steel plate and the location of the center line of the slide rail after rolling on the steel plate was measured.

In Comparative Example 1, a slide rail made of a stainless steel (having a thickness of 1.2 mm, a width of 2 cm and a length of 150 cm) and the steel plate were adhered and laminated with the pressure-sensitive adhesive double coated tape in which the release liners were removed. On the adhered slide rail, a resin roller for rolling which had a diameter of 20 mm and was made of polyacetal, was rolled reciprocally 5000 times along to the length direction of the slide rail under the condition of a load of 45 kg. The shift between the location of the center liner of the slide rail before rolling on the steel plate and the location of the center line of the slide rail after rolling on the steel plate was measured.

Measurement of Soundproof Property

In Examples 1 to 8 and Comparative examples 2 and 3, the release liner was removed from the obtained adhesive sheet with the release liner. And then, the obtained adhesive sheet (having a width of 2 cm and a length of 150 cm) was set between a slide rail made of a stainless steel (having a thickness of 1.2 mm, a width of 2 cm and a length of 150 cm) and the steel plate, and was heated at 180° C. for 40 minutes to adhere. After heating and adhering, the laminate of the slide rail and the steel plate was cooled to the room temperature. On the adhered slide rail, a resin roller for rolling which had a diameter of 20 mm and was made of polyacetal, was rolled along to the length direction of the slide rail under the condition of a load of 45 kg in an anechoic room. The sound generated by the rolling was measured by using a microphone according to JIS Z8732.

In Comparative Example 1, a slide rail made of a stainless steel (having a thickness of 1.2 mm, a width of 2 cm and a length of 150 cm) and a stainless sheet were adhered and laminated with the pressure-sensitive adhesive double coated tape in which the release liners were removed. On the adhered slide rail, a resin roller for rolling which had a diameter of 20 mm and was made of polyacetal, was rolled along to the length direction of the slide rail under the condition of a load of 45 kg in an anechoic room. The sound generated by the rolling was measured by using a microphone according to JIS Z8732.

TABLE 1

| | Example | | | |
|---|---|---|---|---|
| | 1 | 2 | 3 | 4 |
| Ingredients of Composition | | | | |
| Strontium ferrite powder | 10 | 20 | 30 | 45 |
| Barium ferrite powder | — | — | — | — |
| Neodymium-iron-boron based powder | — | — | — | — |
| Polyester resin based hot-melt adhesive | 90 | 80 | 70 | 55 |
| SIS based hot-melt adhesive | — | — | — | 100 |
| Results of evaluation | | | | |
| Density at 20° C. (g/cm$^3$) | 1.5 | 2.2 | 3.0 | 4.3 |
| Magnetic force at room temperature before heating (mT) | 15 | 27 | 40 | 44 |
| Magnetic force at room temperature after heating (mT) | 0 | 0 | 0 | 0 |
| Temporary fixing test | ○ | ○ | ○ | ○ |
| Shearing force (N/1 cm□) | 850 | 720 | 600 | 380 |
| Load test shift dimension (mm) | 0 | 0 | 0 | 0 |
| Soundproof property (dB) | 25 | 24 | 21 | 20 |

TABLE 2

| | Example | | | |
|---|---|---|---|---|
| | 5 | 6 | 7 | 8 |
| Ingredients of Composition | | | | |
| Strontium ferrite powder | 50 | — | — | 10 |
| Barium ferrite powder | — | 30 | — | — |
| Neodymium-iron-boron based powder | — | — | 10 | — |
| Polyester resin based hot-melt adhesive | 50 | 70 | 90 | — |
| SIS based hot-melt adhesive | — | — | — | 90 |
| Results of evaluation | | | | |
| Density at 20° C. (g/cm$^3$) | 4.4 | 2.1 | 1.6 | 1.5 |
| Magnetic force at room temperature before heating (mT) | 48 | 32 | 25 | 10 |
| Magnetic force at room temperature after heating (mT) | 0 | 0 | 0 | 0 |
| Temporary fixing test | ○ | ○ | ○ | ○ |
| Shearing force (N/1 cm□) | 350 | 590 | 800 | 300 |
| Load test shift dimension (mm) | 0.2 | 0 | 0 | 0.8 |
| Soundproof property (dB) | 18 | 23 | 24 | 25 |

TABLE 3

| | Comparative Example | | |
|---|---|---|---|
| | 1 | 2 | 3 |
| Ingredients of Composition | | | |
| Strontium ferrite powder | — | 7 | 60 |
| Barium ferrite powder | — | — | — |
| Neodymium-iron-boron based powder | — | — | — |
| Polyester resin based hot-melt adhesive | — | 93 | 40 |
| SIS based hot-melt adhesive | — | — | — |
| Results of evaluation | | | |
| Density at 20° C. (g/cm$^3$) | 1.0 | 1.3 | 4.6 |
| Magnetic force at room temperature before heating (mT) | 0 | 9 | 51 |
| Magnetic force at room temperature after heating (mT) | 0 | 0 | 0 |
| Temporary fixing test | X | X | ○ |
| Shearing force (N/1 cm□) | 550 | 900 | 200 |
| Load test shift dimension (mm) | 0 | 0 | 1.5 |
| Soundproof property (dB) | 31 | 30 | 20 |

The adhesive sheets of Examples 1 to 8 had a sufficient magnetic flux density to rail, could be easily moved fix temporarily before heating, the slide exhibited large shift shearing force after in the load test or heating, caused no location small location shift in the load test of the level which did not cause the interference practically, and generated sound volume of less than 30 dB, and therefore, had a superior soundproof property.

On the other hand, the pressure-sensitive adhesive double coated tape of Comparative Example 1 was difficult to be peeled after sticking, could be not reattached to stick to the correct location when the sticking location is incorrect, and had an inferior soundproof property. The adhesive sheet of Comparative Example 2 had low magnetic flux density, could not fix temporarily the slide rail, and had an inferior soundproof property. The adhesive sheet of Comparative Example 3 caused large shift dimension in the load test, and therefore, there was a possibility that the interference was caused practically.

The invention claimed is:

1. An adhesive composition for a slide rail, which comprises a hot-melt adhesive and a ferromagnetic material, wherein a density at 20° C. of the composition is 1.4 to 4.5 g/cm3, and the composition has a magnetism such that the magnetic flux density at a position which is 1 cm away from a surface of an adhesive sheet obtained by forming the composition is 10 mT or more, the ferromagnetic material is a magnetic powder, the mixing ratio of the magnetic powder is in the range of 92:8 to 45:55 in volume ratio of the hot-melt adhesive and the magnetic powder, and the surface magnetic flux density after heating at 180° C. for 40 minutes is not more than 3 mT, and wherein the adhesive composition does not contain a foaming agent.

2. The adhesive composition for a slide rail as claimed in claim 1, wherein the ferromagnetic material is a ferrite.

3. The adhesive composition for a slide rail as claimed in claim 2, wherein the hot-melt adhesive is a polyester resin based hot-melt adhesive.

4. An adhesive sheet for a slide rail which is a sheet having a layer composed of the adhesive composition for a slide rail as claimed in claim 2.

5. A laminate of a slide rail and an adhesive sheet, wherein the laminate comprises the adhesive sheet as claimed in claim 4 and a slide rail laminated on the adhesive sheet.

6. An adhesive sheet for a slide rail which is a sheet having a layer composed of the adhesive composition for a slide rail as claimed in claim 3.

7. A laminate of a slide rail and an adhesive sheet, wherein the laminate comprises the adhesive sheet as claimed in claim 6 and a slide rail laminated on the adhesive sheet.

8. The adhesive composition for a slide rail as claimed in claim 1, wherein the hot-melt adhesive is a polyester resin based hot-melt adhesive.

9. An adhesive sheet for a slide rail which is a sheet having a layer composed of the adhesive composition for a slide rail as claimed in claim 8.

10. A laminate of a slide rail and an adhesive sheet, wherein the laminate comprises the adhesive sheet as claimed in claim 9 and a slide rail laminated on the adhesive sheet.

11. An adhesive sheet for a slide rail which is a sheet having a layer composed of the adhesive composition for a slide rail as claimed in claim 1.

12. An adhesive laminate of a slide rail which comprises the adhesive sheet as claimed in claim 11 and a slide rail laminated on the adhesive sheet.

13. The adhesive composition of claim 1, wherein the hot-melt adhesive has a melting point in the range of 80° C. to 200° C.

14. The adhesive composition of claim 1, wherein the adhesive composition has a viscosity of 5 to 500 Pa·s at 130° C.

15. The adhesive composition of claim 1, wherein the adhesive composition has a viscosity of 15 to 200 Pa·s at 130° C.

16. The adhesive composition of claim 1, wherein the adhesive composition has a shearing force after heat adhesion at 150° C. for 10 minutes of not less than 250 N.

17. A method for attaching a slide rail which comprises temporarily fixing a slide rail on a member of a body with the adhesive sheet for the slide rail as claimed in claim 11, and then fixing the slide rail by heating the adhesive sheet for slide rail.

18. A method for attaching a slide rail which comprises temporarily fixing a slide rail on a member of a body with the adhesive sheet for the slide rail as claimed in claim 4, and then fixing the slide rail by heating the adhesive sheet for slide rail.

19. A method for attaching a slide rail which comprises temporarily fixing a slide rail on a member of a body with the adhesive sheet for the slide rail as claimed in claim 9, and then fixing the slide rail by heating the adhesive sheet for slide rail.

20. A method for attaching a slide rail which comprises temporarily fixing a slide rail on a member of a body with the adhesive sheet for the slide rail as claimed in claim 6, and then fixing the slide rail by heating the adhesive sheet for slide rail.

* * * * *